May 18, 1937.  G. McK. FITTS  2,080,769
POSITIVE LOCK FASTENER
Filed Dec. 20, 1934   2 Sheets—Sheet 1

INVENTOR
George McKinley Fitts.

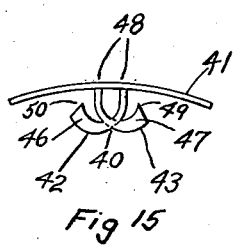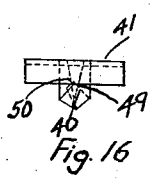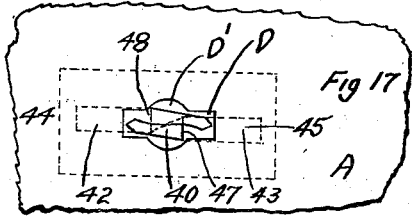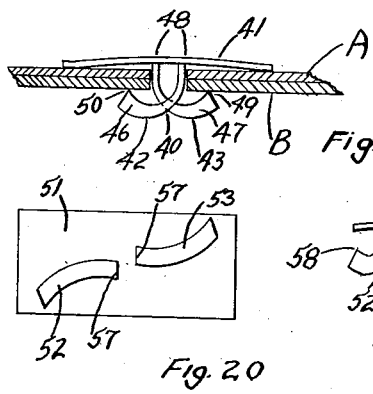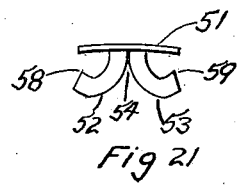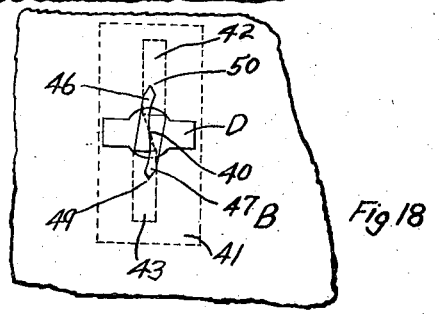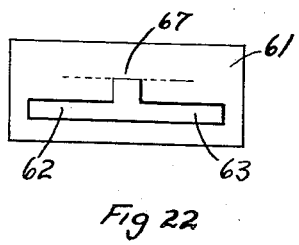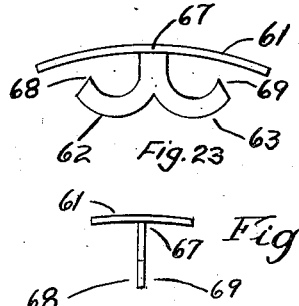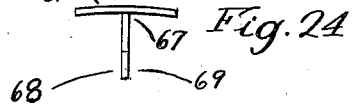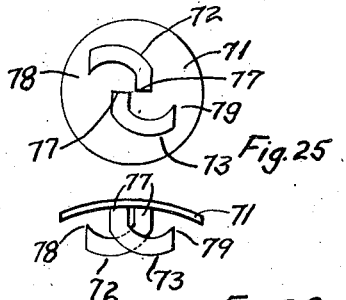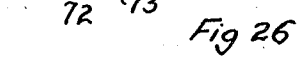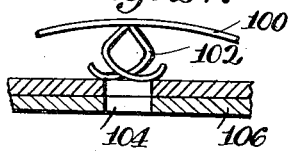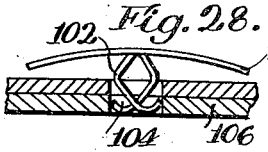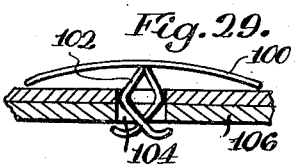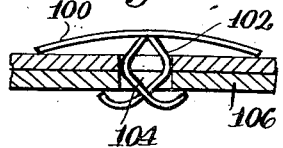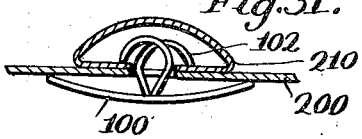

Patented May 18, 1937

2,080,769

UNITED STATES PATENT OFFICE 2,080,769

POSITIVE LOCK FASTENER

George McKinley Fitts, Washington, D. C.

Application December 20, 1934, Serial No. 758,491

31 Claims. (Cl. 85—5).

This invention relates to a method of and means for attaching panels or similar sheets and sections to a framing, support or sheet structure, it being more particularly adapted for fastening together a plurality of superposed sheets where it is necessary or desirable that a strong, inexpensive, easily and quickly applied fastening installation be employed.

Heretofore it has been the common practice in fastening superposed sheets, panels, or similar sections to use the conventional bolt and nut or the push-type fastener or clip. However in situations where a fastener may be applied from only one side a conventional bolt and nut is out of the question and it is necessary to use some expensive, cumbersome device which will permit application from the accessible side. Also in fastening a seam in sheet metal where it is necessary to place fastening means every two inches or so, a large number of bolts would be necessary with the obvious great increase in weight which is, in many instances, very objectionable, as for example in airplane cowling, sheet metal tubing or sheet metal packing cases and containers. Especially is this so in fastening airplane cowling where lightness, durability and positive locking of the fastening devices are of the greatest importance. As for the use of the push type fastener or clip, it is common knowledge that these depend entirely on the resiliency of the legs abutting the side walls of the aperture for holding them in place and that therefore they cannot provide a tight, rigid fastening and are subject to looseness from vibration and jarring with the ultimate result that they fall out entirely.

It is therefore an object of this invention to provide a fastening device, of general utility which is light in weight, durable and efficient in use and which is applied from one side of superposed members to be fastened. It is especially adapted for use in fastening airplane cowling sheet metal tubing and metal containers, etc., where durability and positive locking are of primary importance; it is highly efficient for fastening license plates and toe boards on automobiles and sheet metal moldings, superposed sheets, panels and like sections, generally.

Another object of the invention is to provide fasteners which are very simple in construction and extremely cheap to manufacture, the entire fastener being made of a single piece of sheet spring steel or sheet metal and which may be formed by a single operation of a punch and forming die from a suitable strip of the aforementioned metal without any loss or waste of material whatsoever.

It is also an object of the invention to provide a one piece fastener having diverging cam legs formed from and extending integrally from a resilient head portion and which may be easily and simply applied in locking position to suitably apertured superposed sheets or parts by a simple push or simultaneous push and twist of the thumb through ninety degrees without the aid of special tools, hammers, drivers, etc., necessary for installing the more common type of fastening devices.

A further object of the invention is to provide a one-piece sheet metal fastener which when applied in fastening position affords a positive lock to the fastener in all directions such that it is not subject to loosening from vibration or jarring and will maintain the superposed parts or sheets tightly in the position in which they were fastened originally. That is to say, the device of the invention aims to provide a fastener in which a locking force is exerted at points on either end of the shank longitudinally of its axis and also at opposite points transversely of its axis, thus leaving no portion of the fastener not under a locking tension and also eliminating looseness against the side walls of the aperture.

A still further object of the invention is for a fastener in which the shank or diverging leg members are struck from a disc or section of sheet metal or sheet spring steel but leaving the periphery of the disc or section imperforate and unbroken in order to provide a head portion having the greatest possible resistance to withstand shearing and breaking along its weakest points and yet have sufficient resiliency to maintain the shank or leg members under extraordinary axial tension to prevent looseness of the device in fastening position. Another object is to provide a fastening device in which the head portion and shank portions struck therefrom, all are resilient, the shank portions being so connected and formed relative to the head that the resilience of the head provides and adds to the resilience of the shank portions.

Another object of the invention is to provide a rotary fastener having a shank composed of overlapping converging and diverging cam legs which cam legs when in their normal or untensioned position diverge relative to each other but when placed in fastening position and rotated are caused to converge under camming action against the walls of the aperture. The shanks being overlapped in crossed relation, the prongs thereon are moved to extreme diverging locking position by such cam converging of the shanks.

Another object is to provide a fastener consisting of a resilient head and overlapping and diverging legs comprising holding elements formed so that when the fastener is applied to locking position the superposed sheets, being drawn tightly together, are maintained firmly in such position under tension of the resilient head portion, exerting axial pull on said holding elements.

Another object is to provide a rotary type fastener having a resilient head portion and diverging leg holding elements provided on their free ends with sharp prongs, which prongs, under axial tension of the resilient head portion, are caused to bite into and lock the leg portions in holding position and resist reverse rotation of the fastener.

A further object is to provide certain other new and useful features all as hereinafter set forth and more particularly pointed out and as will be apparent to those skilled in the art, reference being had to the accompanying drawings in which:

Fig. 15 is an edge elevation of another modification of the crossed leg type of fastener in which the legs are twisted gradually to a position at right angles to the head portion.

Fig. 16 is an end view of the modification shown in Fig. 15.

Fig. 17 is a bottom plan view of the fastener shown in Fig. 15 applied in an aperture in work.

Fig. 18 is a bottom plan view of the fastener shown in Fig. 15 rotated to locking position in apertured work.

Fig. 19 shows the fastener of Fig. 15 applied in locking position in superposed apertured sheets.

Fig. 20 is a top plan view of a modification showing diverging legs struck from and extending transversely of the rectangular blank head.

Fig. 21 is an end view of Fig. 20.

Fig. 22 is another modification in top plan showing diverging legs struck from and extending at right angles to the head.

Fig. 23 is an edge elevation of the fastener shown in Fig. 22.

Fig. 24 is an end elevation of the fastener shown in Fig. 22.

Fig. 25 shows another modification of the crossed leg type of fastener in which the legs are struck from a circular disc and extended at right angles to the head.

Fig. 26 is an edge elevation of the fastener shown in Fig. 25.

Fig. 27 is a side elevation of a modified form of fastener about to be applied to the work.

Fig. 28 is a similar view of the fastener with the legs thereof being passed through an aperture in the work.

Fig. 29 is a similar view of the modified form of fastener shown in Figs. 27 and 28 with the attaching legs passed through the work and in position to be released.

Fig. 30 is a side elevation of the form of fastener shown in Figs. 27, 28 and 29 with the fastener released for action in securing the work in place.

Fig. 31 is a side elevation of the fastener shown in Figs. 27 to 30, inclusive, employed as an attaching means for moulding.

Like reference characters represent like parts throughout the several figures.

Figure 1:
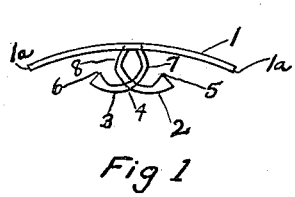
Fig. 1 is a transverse view of a completed fastener, showing crossed legs and twisted anchoring prongs.
Figure 2:
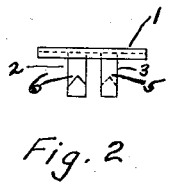
Fig. 2 is a side elevation of the fastener shown in Fig. 1.
Figure 4:
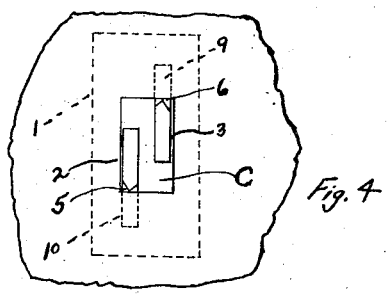
Fig. 4 shows a bottom plan view of the fastener of Figs. 1-3 in position to be applied to apertured superposed sheets.
Figure 3:
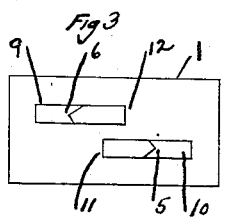
Fig. 3 is a top plan view of the completed fastener of Fig. 1.
Figure 5:
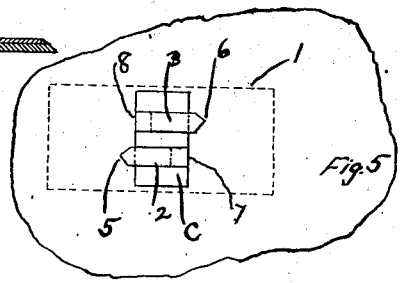
Fig. 5 shows the same fastener 90° removed in locking position.

Referring to the accompanying drawings Fig. 1 shows the preferred form of the invention. The fastener is formed entirely from sheet metal and is complete in itself from a small rectangular section or disc of stock of predetermined width. The entire section or disc designated 1 constitutes the head portion of the fastener, which head portion during the stamping operation is bowed or is rendered convex to increase the resiliency thereof for a purpose hereinafter set forth. The convexity may extend both transversely and longitudinally of the rectangular section or either transversely or longitudinally only. The preferred form shows the head portion as convex longitudinally of the section only. In the stamping operation, leg or shank members 2, 3 are stamped from the disc and offset laterally from each other as at 9, 10 and project away from the head 1 being integral therewith at 11, 12. The leg members are partially bent back upon themselves to define cam surfaces 7, 8 and then extend in diverging relation crossing each other as shown at 4, Figs. 1 and 6. From the point approximately of crossing relation at 4 the legs are rounded, bent or deformed to provide diverging toe portions and at their extreme ends are twisted laterally to expose in a position substantially at right angles to the head a corner edge of each leg, thus providing a point or prong which is adapted to dig into and embed itself in the bottom sheet B thus serving to lock the device in fastening position and resist reverse rotation thereof. The fastener of this form of the invention is adapted for use with superposed sheets having a rectangular slot or aperture C, Fig. 4. It is applied in position with the major axis, defined by legs 2, 3 extending the length of the slot and then given a quarter turn to the position shown in Fig. 5 with the prongs 5, 6 extending over the edge of the slot in locking position.

The legs preferably are of such length that the distance between the lateral edges 1a of the head members, Fig. 1 and the points of prongs 5, 6 of the legs is less than the combined thickness of the sheets to be fastened. Upon application of the fastener the resilient concave head portion is flattened by the thumb of the mechanic causing the prongs 5, 6 to lie clear of the walls of the slot C on the underside of the superposed sheets. With the head in the flattened position and the prongs 5, 6 clear of the walls of the slot C, rotation of the fastener is permitted to the locking position of Fig. 5. When in such locking position the head 1 is released from its flattened position and the prongs 5, 6 are caused to bite and dig into the lower sheet B, Fig. 6 due to axial pull on the legs exerted by the resilient head portion as shown by the vertical arrows Fig. 6. The head in its locking position will assume a somewhat flattened condition at its ends with a slight concavity in the center where the resilient tension is stored.

Figure 6:
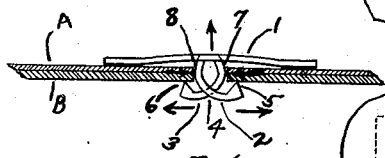
Fig. 6 is a transverse view of the completed fastener in locking position.

It will be noted that during the rotation of the fastener to locking position, the cam surfaces 7, 8 on the legs are caused to abut the side walls of the slot to force the crossed legs in diverging locking relationship at their ends in the direction of the horizontal arrows Fig. 6. With such an arrangement a locking force transverse of the longitudinal axis of the fastener is exerted continuously on the diverging crossed leg members. Thus it will be seen that the device exerts a locking force on either end of the shank longitudinally of its axis due to the resilient head portion, and also at opposite points transversely of its axes due to the tension set up in the leg members by the cam surfaces 7, 8 abutting the side walls of the slot. It will be obvious then, to those skilled in the art, that there is no portion of the fastener, head or shank, not under a locking tension at all times and thus any tendency of the fastener to shake loose due to vibration or jarring is greatly minimized.

Figure 7:
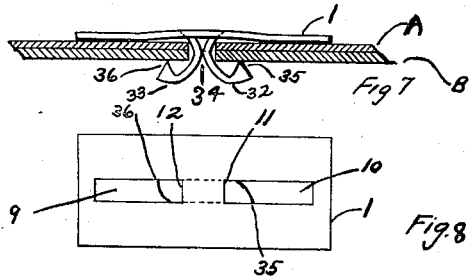
Fig. 7 is a modification of the fastener showing a transverse view in which the legs abut to lock each other in position.
Figure 8:
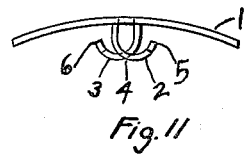
Fig. 8 is a top plan view of the fastener of Fig. 7.

In Figure 7 a modified form of fastener is shown in which the legs 32, 33 are directly opposite each other when stamped as at 9, 10 Fig. 8 being integral at 11, 12 with the blank forming the head portion 1. The legs are bent downwardly and inwardly from the head in the form of bows abutting as at 34 and then extend in diverging relation being rounded at their lower ends to provide resilience. At their extreme ends the legs may be twisted angularly to expose a corner of the legs which act as prongs 35, 36 for locking into the work. In this form of the invention the resilient head exerts a locking force on either end of the longitudinal axis as in the preferred form in Fig. 6 but the forces acting transversely of the fastener are obtained by means of the abutting action of the bows which maintains the leg members at all times in diverging relation in locking position. This form of the invention is advantageous in that a smaller slot may be used, that is, the size of the slot need be no wider than the width of the legs since the legs abut each other and are not offset as shown in Figs. 1 and 14, which require a slot of greater width.

Either of the above described fastening devices may be used in different ways and for other objects but they are designed primarily for fastening superposed apertured sheets. For example in Figs. 9 and 10 the fastener of the preferred form is shown as adapted also as a snap stud in addition to its use for fastening superposed sheets. The entire device is stamped from a suitable length of sheet material as shown in Fig. 10. During the stamping the head may be provided with the usual convexity for resilience with the crossed leg members 2, 3 stamped from the head at 9, 10 and being integral therewith at 11, 12. At 16, 17 the blank is bent back upon the head portion providing auxiliary head portions 21, 22, from which the snap stud sections 23, 24 outlined at 14, 18 and 15, 19 are bent into suitable form and then bent at right angles to the auxiliary head portions 21, 22. It is obvious that the snap stud sections 23, 24 may be bent or stamped in any other desired form to provide bendable prongs or clips, semi-circular portions interiorly threaded to receive a bolt, or exteriorly threaded to receive a nut.

Figure 9:
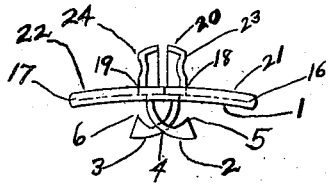
Fig. 9 is a modification of the crossed leg fastener of Fig. 1 showing additional integral securing means formed on the head.
Figure 10:
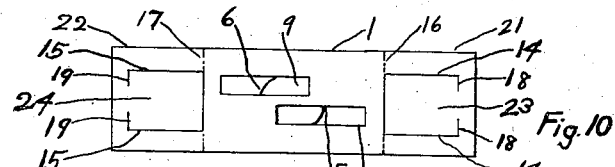
Fig. 10 is a plan view of the blank from which the completed fastener of Fig. 9 is formed.

The subject matter disclosed in Figures 9 and 10 is embodied and claimed in a copending application Serial No. 105,584, filed October 14, 1936, which is a continuation in part of this application.

Figure 11:
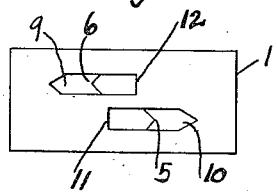
Fig. 11 is a transverse view of a modification of the crossed leg type of fastener showing prong means formed on the ends of the legs by the stamping operation.
Figures 12, 13, 14:
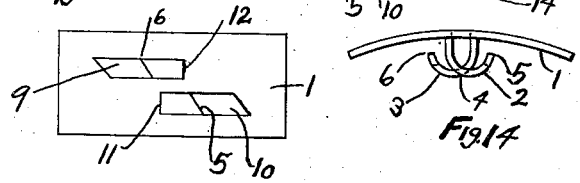
Fig. 12 is a top plan view of the fastener shown in Fig. 11.
Fig. 13 is a top plan view of another modification of the crossed leg type of fastener showing prong means formed on the ends of the legs by the stamping operation.
Fig. 14 is an edge elevation of the fastener shown in Fig. 13.

A modified form showing another method of stamping the prongs at the extreme ends of the legs is shown in Figs. 11, 12. In this form the ends of legs 2, 3 are stamped V-shaped which when rounded upwardly provide anchoring prongs, 5, 6. The legs as in the previous forms are integral at 11, 12 with the convex head portion 1, being suspended therefrom in an area approximately at the center thereof. Due to the increased holding power of the prongs so formed the use of cam surfaces on the legs may be dispensed with and the entire locking action obtained from the resilient head portion exerting axial tension on the prongs 5, 6 Fig. 11. The foregoing is true also of the modification shown in Figs. 13 and 14 in which the prongs are stamped in a modified V-shape with one edge of each leg forming a side of the prong.

As illustrated in Figures 27 to 30, inclusive, a modified form of fastener may be employed in cases where the apertures in the work are round, square or rectangular as distinguished from being elongated. In these figures, the numeral 100 designates a longitudinally curved or bowed head rendered resilient through such curvature or bowing. The head 100 is shown to be provided with a pair of longitudinally curved legs 102, the curvature of these legs being in opposite directions so that the intermediate portions of the legs are provided with what might be said to be shoulders for pressure engagement with the side walls of the associated aperture 104 in the work 106.

The outer terminal portions of the legs are shown to be provided with return bends presenting what might be said to be cam surfaces for sliding engagement with the entrance ends and the side walls of the aperture 104.

It will be seen that the space between the outer terminal portions of the legs 102 is slightly greater than the diameter of the aperture 104 with the result that the application of the curved terminal portions to the entrance ends of the aperture brings together such terminal portions of the legs so that the legs may pass through the aperture after the fashion suggested in Figure 28.

Of course, the legs 102 are crossed between the ends thereof so that the curved cam surfaces of such legs are properly presented to the entrance ends of the aperture to be moved into the overlapping positions suggested in Figure 28.

Upon the passage of the legs and more particularly the terminal portions of such legs through the aperture 104, the inherent resiliency of the legs is allowed to assert itself so as to spring the terminal portions of the legs laterally beyond the opening 104 through which the same were passed.

Of course, the fastener is applied by manual or tool pressure so as to force the legs through the opening 104. By reference to Figure 30, it will be seen that upon the release of manual or tool pressure on the head 100, the inherent resiliency of the head 100 is allowed to assert itself and thereby exert a rearward or axial pull on the legs 102 so as to move the terminal portions of the legs into anchoring or penetrating engagement with the opposed surface of the work.

From Figures 27, 28, 29, and 30, it will be seen that the fastener may be employed to advantage in cases where it is not possible to rotate the fastener to a self-retaining position. That is to say, the mere endwise movement of the legs through the opening 104 will result in the movement of the terminal portions of these legs to operative positions in penetrating engagement with what might be said to be the under or opposed side of the work 106, making it unnecessary to turn the fastener approximately ninety degrees to establish the desired anchoring engagement of the legs with the work.

As brought out in the opening paragraphs of the specification, the fastener may be employed in securing molding in place. An example of this is shown in Figure 31 in which the fastener 100 is extended through the panel 200 and is engaged with the molding 210.

In Fig. 15 is shown another modification of the crossed leg type of fastener, this form being more particularly adapted for use where slots of the configuration of D Figs. 17 and 18 are employed. The advantage of the use of such a slot is two fold; first the width of the slot itself may be much narrower than the slot c Fig. 4 of the preferred form; second, the fastener being in transverse locking position is prevented from shifting laterally by the round section D¹ of the slot. In this modification the head portion 41 as in the preferred form is concaved for resiliency during the stamping operation with the leg members 42, 43 being struck therefrom as at 44 and 45 downwardly and outwardly, crossing each other as at 46 and being integral with the head portion as at 47. The legs, as shown in Fig. 17 are only slightly offset relative to each other, being almost directly opposite. On being struck downwardly each leg is twisted gradually from a point adjacent the head such that the lower portions 46, 47 of the legs are disposed substantially at right angles to the head portion, and anchoring prongs 49, 50 at the extreme ends of the legs are provided. Since the lower portions 46, 47 of the legs are flat and substantially parallel to each other, the width of the slot D in the superposed sheets need be very small to accommodate the twisted leg members when the fastener is applied.

In Figs. 20 and 21, is shown a form of the fastener in which the leg elements 52, 53, including the locking toes are stamped from the dished, concave, resilient head member 51 in substantially opposite or slightly offset relation and bent away from the said head as at 57 to extend perpendicular thereto in substantially parallel planes at right angles to the longitudinal axis of the resilient head portion. The leg members are stamped in such form and of such configuration that the outer end sections thereof present preformed, diverging, toe portions, the metal of which may be slightly bent as in the preferred form, elongated, or deformed as necessary to make the toe portions more pronounced, such that they extend in even greater diverging relation and are directed upwardly toward the head 51 as in Figure 21, and the outer intersecting edges of said toe portions define work engaging prongs 58, 59. This form is advantageous in that it may be applied into fastening position in superposed apertured sheets using a relatively narrow elongated slot. Also in this form of the fastener device the axial pull of the resilient head portion is exerted at points along the transverse axis of the head, thus maintaining the leg members under a constant tension to urge the prongs 58, 59 upwardly into locking engagement with the adjacent under face of the work at spaced points, substantially in line and in an area substantially at right angles to the longitudinal axis of the head member 51.

In Figs. 22–24 inclusive the entire shank is stamped from the blank and head portion 61 in a substantially T-shape form and is integral with the head at 67. When bent at right angles to the head the legs 62, 63 are bent, distended or deformed upwardly to provide anchoring prongs, 68, 69. As is obvious from Fig. 24 this type of fastener requires only a very narrow slot to receive the leg members 62, 63 in order to apply the device to locking position.

In Figs. 25, 26 is shown still another modification in which the device is stamped from a disc. From a point approximately at the center of the concave head portion 71, legs 72, 73 provided with prongs 78, 79 at their ends are stamped and bent to a position substantially at right angles to the head, being integral with the head at 77. Such an arrangement provides a small compact fastener of great strength and resilience and may be made from a minimum of stock.

The subject matter of Figures 20 to 26, inclusive, is embodied and claimed in a divisional application Serial No. 104,905, filed October 9, 1936.

While I have illustrated and described the preferred embodiments of my invention, it is to be understood that I am not to be limited thereby.

It is obvious that changes may be made in the arrangement and construction of the various parts of my improved device without departing from the spirit of the invention, and it is therefore to be understood that the scope of the invention be indicated by the appended claims rather than the foregoing description.

What is claimed is:

1. A fastening device complete in itself and adapted for securing superposed apertured members, comprising a resilient head portion stamped from a single thickness of sheet metal, leg members stamped from within the periphery of said head portion, said leg members being integral with said head portion in the center area thereof and bent away therefrom to provide a shank and being further bent to provide work penetrating prongs adapted to be placed under tension by pull of said resilient head portion.

2. A one piece sheet metal fastener for securing apertured work comprising a concave resilient head portion, integral leg members stamped from within the periphery of said head portion and suspended from the center area thereof to provide a shank, said leg members being placed under axial tension by pull of the resilient head portion when in locking position, said leg members being bent out of their planes to provide locking projections urged into pressure engagement with the work by the said axial tension on the legs.

3. A one piece sheet metal fastener for securing apertured work comprising a body section forming a head member, integral leg members stamped from and bent away from said head member to provide a shank, said leg members having return bends and at their outer ends diverging from each other to form outwardly extending toe portions, said toe portions being so formed at their extremities as to expose sharp anchoring prongs for penetrating locking engagement in the work.

4. A fastening device as described in claim 3 in which the head member is resilient and in which the leg and toe elements are adapted to be placed under axial tension by pull exerted by the resilient head member, and the anchoring prongs caused to dig into the adjacent work surface to lock the fastener in position.

5. A fastening device of the type described comprising a resilient concave head portion, integral leg members extending from said head portion forming a shank, said leg members at their outer ends diverging and having return bends to form outwardly extending toe portions normally untensioned, said toe portions, when the fastener is applied to locking position, being placed under axial tension by the pull thereon exerted through the leg members by the resilient head portion.

6. In combination with superposed apertured sheets or the like having aligned slots, a one piece rotary fastener device comprising a concave resilient head portion, integral leg members stamped from and extending from said head portion at the center area thereof, said leg members at their outer ends diverging to form upwardly extending toe portions, the distance between the extremity of each said toe portion and the outer lateral edge of the concave head portion being less than the combined thickness of the superposed sheets, such that when the fastener is applied in the slot of the superposed sheets and the concave head flattened by pressure the extremities of the toe portions will clear the surface of the lower sheet thus permitting rotation of the fastener to locking position whereupon release of pressure, the head portion will tend to assume its normal concave form thus exerting a pull on said leg members to place the upwardly extending toe portions under axial tension.

7. The combination set forth in claim 6 in which the outer extremities of the toe portions are formed into prongs adapted to dig into and embed themselves in the lower sheet when placed under axial tension, thus locking the device in fastening position and resisting reverse rotation thereof.

8. A fastener stamped from a single section of sheet metal comprising a shank, a resilient head having portions thereof yieldable relative to said shank, integral leg members depending from said head to form said shank and extending downwardly therefrom in converging relation with the ends in diverging relation to provide locking projections adapted to be placed under tension in more than one direction when the fastener is in locking position.

9. A locking fastener stamped from a single section of flat sheet metal comprising a resilient concave head portion and integral leg members stamped from within the periphery thereof, said leg members extending away from said head and bowed intermediate their ends to provide cam surfaces and being further bent inwardly to cross each other such that their ends are in diverging relation.

10. A rotary fastener stamped from a single thickness of sheet metal comprising a resilient concave head portion integral leg members extending from said head portion to form a shank, said leg members extending in converging relation to cross each other, and diverging toe portions at the ends of said crossed leg members adapted to be forced in still further diverging relation when the fastener is rotated to locking position.

11. A fastener for use with apertured sheets comprising a shank, a head having portions thereof axially yieldable relative to said shank, said shank being composed of integral leg members extending from said head portion in converging relation to cross each other such that the outer sections of said leg members are in diverging relation, cam surfaces formed on said leg members adapted to abut the side walls of the aperture and maintain said outer leg sections in diverging relation under tension transversely in locking position simultaneous with an axial pull on said legs exerted by the said yieldable portions of the head.

12. A fastening device for use with apertured sheets comprising a resilient concave head portion, integral leg members extending from said portion in crossed relation to form a shank, toe sections in diverging relation on the outer ends of said leg members defining locking projections, and cam surfaces formed on said leg members adapted to abut the side walls of the aperture to maintain said toe sections in still further diverging relation simultaneous with an axial tension on the leg members from the pull exerted by the resilient head portion.

13. A fastener formed of a single thickness of sheet metal, comprising a head portion, integral leg members stamped from said head in opposing position and converging downwardly therefrom to abutting relation, and return bends defining upwardly extending diverging toe elements at the ends of said legs maintained in transverse locking position by said abutting relation.

14. A fastener as claimed in 13 in which the head portion is resilient and exerts an axial pull on the diverging toe elements to place them under axial tension.

15. A fastening device comprising a head portion stamped from a single thickness of sheet metal, integral leg members extending away from said head portion to form a shank, said leg members depending from said head in opposing relation and twisted adjacent the head portion to lie in substantially parallel planes in a position at right angles to said head portion.

16. A fastening device having a head of a single thickness of sheet metal, integral leg members, stamped from said head in opposing relation and extending away therefrom to form a shank and diverging toe elements, said leg members being twisted intermediate their lengths such that portions thereof lie in substantially parallel planes substantially at right angles to said head.

17. A fastener of the type described in claim 16 in which the head is dished for resiliency and in which the diverging toe elements are placed under axial tension by the pull exerted on the leg members by the resilient head portion.

18. In a fastener for application from one side of apertured work, a one-piece sheet metal device including a head having legs for passage through the aperture in the work and being fully crossed at points between the ends thereof thereby causing the terminals of the legs to diverge from each other, the portions of the legs between the point of crossing and said head being bowed outwardly from each other for pressure engagement with the side walls of the aperture to maintain the terminals of the legs in spaced relation to the aperture and in locking position in engagement with the work.

19. In a fastener for application from one side of apertured work, an inherently resilient head having legs for passage through the aperture in the work and being fully crossed at points between the ends thereof thereby causing the terminals of the legs to diverge from each other, the portions of the legs between the point of crossing and said head being bowed outwardly from each other for pressure engagement with the side walls of the aperture to maintain the terminals of the legs in spaced relation to the aperture and in locking position in engagement with the work, the terminal portions of said legs being directed toward the adjacent side of the work and having prongs for anchoring engagement with the work and urged into engagement with the work by the inherent resiliency of said head.

20. In a fastener for application to apertured work from one side of such work, a pair of inherently resilient legs for passage through an aperture in the work, and a sheet metal head supporting the legs and having an inherent resiliency exerting a constant longitudinal pull on the legs, said legs being crossed at points between the ends thereof and being curved longitudinally to present the outer terminals of the legs for penetrating engagement with the opposed side of the work at points spaced laterally of the said aperture.

21. In a fastener for application to apertured work from one side of such work, an inherently resilient sheet metal head having a pair of complemental inherently resilient legs projecting angularly therefrom for passage through the aperture in the work and having return bends presenting toe portions on the legs extending upwardly toward the head for pressure engagement with the opposed side of the work under axial pull of said inherently resilient head, the intermediate portions of the legs having the opposed surfaces thereof in mutual pressure engagement to urge the toe portions laterally away from the said aperture in the work.

22. In a one-piece fastener for application to apertured work from one side of such work, a single thickness sheet metal head, integral resilient leg members stamped from and bent away from said head portion to provide a shank, said resilient leg members being bent adjacent the outer ends thereof in diverging relation to define outwardly and upwardly extending toe portions directed toward the head, said toe portions being bent for resilient pressure engagement with the work.

23. A fastener complete in itself and adapted for securing superposed apertured members comprising an inherently resilient head portion formed from a single thickness of sheet metal or spring steel, integral leg members stamped from said head portion and extending downwardly therefrom to provide a shank, and return bends at the ends of said leg members in the form of toes directed toward the head, said toes being adapted to serve as locking projections engaging the work and adapted to be placed under tension by pull of the said inherently resilient head portion.

24. A fastener comprising a one-piece sheet metal device including a head, integral leg members stamped from said head and extending downwardly therefrom in converging relation to cross each other in normal position, return bends on said legs defining diverging locking projections adapted to be placed under tension in work holding position.

25. A fastener for use with apertured sheets and the like, comprising a shank, a resilient head having portions thereof axially yieldable relative to said shank, said shank being composed of leg members depending from said head, work engaging projections carried by said integral leg members, bowed cam portions on said leg members spaced from said projections, adapted to actuate said projections into locking position during application of the fastener into work-holding relation, said cam portions being also adapted to maintain said projections in locking position in the work under tension by the action exerted on said legs through said cam portions thereon.

26. In combination with superposed sheets or the like having aligned apertures, a one-piece sheet metal fastener comprising an inherently resilient head portion, integral leg members extending from said head portion to provide laterally yieldable shank elements, said leg members being bent intermediate their lengths to provide diverging, projecting toe portions, the distance between the extremity of each said toe portions and the lowermost adjacent edge of the said head member being normally less than the combined thickness of the superposed sheets, such that when the fastener is applied in the aperture of the superposed sheets and axial pressure exerted on the head, the extremities of the toe portions will clear the undersurface of the lower sheet permitting the yieldable shank elements to move laterally such that the toe portions are disposed in locking position at points spaced laterally from said aperture, whereupon release of pressure on the head an axial pull will be exerted on said toe portions engaging the work in said locking position.

27. For use in apertured work, a fastening device formed from a single thickness blank of sheet material, comprising, a head portion, integral leg members depending from said head portion in converging relation to cross each other to provide oppositely extending projections, cam surfaces formed on said leg members adapted to abut the side walls of the aperture to maintain said oppositely extending projections in diverging relation under tension transversely in locking position.

28. For use in apertured work, a fastening device stamped from a single thickness blank of sheet material, comprising a head, a shank composed of legs depending from said head in spaced relation and crossing each other, the spacing of said legs intermediate the head and point of crossing being normally greater than the spacing of opposite walls of the aperture, the free ends of said legs beyond the point of crossing being in the form of diverging toe portions including work engaging elements urged and maintained under pressure in fastening engagement with the work through contact of the legs against the opposite walls of the aperture spaced less than the said normal spacing of said legs.

29. For use in apertured work, a fastening device comprising a shank, a resilient head having portions thereof axially yieldable relative to the shank, said shank being composed of legs depending from said head in spaced relation, the spacing of said legs being normally greater than the spacing of opposite walls of the aperture, the free ends of said legs being in the form of diverging toe portions including work engaging elements urged and maintained in transverse fastening position through contact of the legs against the opposite walls of the aperture spaced less than the said normal spacing of said legs, said work engaging elements being placed under tension in fastening position by axial pull exerted on the legs by the yieldable portions of said resilient head.

30. A one-piece fastening device formed from a a blank of sheet material comprising a head, integral leg members extending from said head in oppositely disposed offset relation, said leg members being staggered at their roots for obtaining added length therein without increase in the size of the blank, said leg members being bent away from said head in spaced relation to form a shank including means adapted for securing the device in fastening position.

31. A one-piece fastening device formed from a blank of sheet material comprising a shank, a head having portions thereof yieldable relative to said shank, said shank being composed of spaced integral leg members extending from said head in oppositely disposed offset relation, said leg members being staggered at their roots for obtaining added length therein without increase in the size of the blank, and means on said leg members adapted for securing the device in fastening position, said means being placed under tension in fastening position by axial pull exerted on the said leg members by the yieldable portions of said resilient head.

GEORGE M. FITTS.